(12) United States Patent
Siegers et al.

(10) Patent No.: US 9,540,455 B2
(45) Date of Patent: Jan. 10, 2017

(54) PROCESS FOR PREPARING CURED POLYMERS

(71) Applicants: LANXESS INTERNATIONAL S.A., Granges-Paccot (CH); UNIVERSITY OF WATERLOO, Waterloo (CA)

(72) Inventors: Conrad Siegers, London (CA); Dana Adkinson, London (CA); Gregory J. E. Davidson, London (CA); Lorenzo Ferrari, Brights Grove (CA); Mario Gauthier, Waterloo (CA)

(73) Assignees: LANXESS INTERNATIONAL SA, Granges-Paccot (CH); UNIVERSITY OF WATERLOO, Waterloo (CA)

( * ) Notice: Subject to any disclaimer, the term of this patent is extended or adjusted under 35 U.S.C. 154(b) by 188 days.

(21) Appl. No.: 14/364,308

(22) PCT Filed: Dec. 21, 2012

(86) PCT No.: PCT/CA2012/001190
§ 371 (c)(1),
(2) Date: Jun. 11, 2014

(87) PCT Pub. No.: WO2013/091084
PCT Pub. Date: Jun. 27, 2013

(65) Prior Publication Data
US 2014/0336336 A1    Nov. 13, 2014

Related U.S. Application Data

(60) Provisional application No. 61/579,478, filed on Dec. 22, 2011.

(51) Int. Cl.
| | | |
|---|---|---|
| *C08C 19/22* | (2006.01) | |
| *C08J 3/24* | (2006.01) | |
| *C08L 23/26* | (2006.01) | |
| *C08K 5/19* | (2006.01) | |
| *C08K 5/28* | (2006.01) | |

(52) U.S. Cl.
CPC .............. *C08C 19/22* (2013.01); *C08J 3/24* (2013.01); *C08J 2300/26* (2013.01); *C08J 2323/00* (2013.01); *C08K 5/19* (2013.01); *C08K 5/28* (2013.01); *C08L 23/26* (2013.01)

(58) Field of Classification Search
CPC .......... C08C 19/22; C08J 3/24; C08J 2300/26; C08J 2323/00; C08K 5/19; C08K 5/28; C08L 23/26
USPC ........................ 525/342, 359.2, 376, 332.8
See application file for complete search history.

(56) References Cited

U.S. PATENT DOCUMENTS

| | | |
|---|---|---|
| 3,058,944 A | 10/1962 | Breslow et al. |
| 4,916,180 A | 4/1990 | Robinson et al. |
| 5,013,793 A | 5/1991 | Wang et al. |
| 5,182,333 A | 1/1993 | Powers et al. |
| 6,512,060 B1 * | 1/2003 | Matyjaszewski ......... C08F 2/38 526/111 |
| 6,960,632 B2 | 11/2005 | Kaszas |
| 7,446,151 B2 | 11/2008 | Resendes et al. |
| 2011/0124819 A1 | 5/2011 | Hoelzl et al. |

FOREIGN PATENT DOCUMENTS

WO        0032650        6/2000

OTHER PUBLICATIONS

Shibata Yosuke et al., "Azidation of polyesters having pendant functionalities by using NaN3 or DPPADBU and photo-crosslinking of the azidopolyesters", Polymer Journal, vol. 43 (2011), The Society of Polymer Science, Japan (SPS pp. 272 -278.
Chu, Yeh Chia et al., "Determination of the Structure of Butyl Rubber by NMR Spectroscopy", Macromolecules 1985, 18, American Chemical Society, Washington DC, USA, pp. 1423-1430.
Morton, Maurice, "Butyl and Halobutyl Rubbers", Rubber Technology, Third Edition, 1987, Van Nostrand Reinhold Company, Inc., New York, New York, USA, pp. 297-300.
International Search Report from International Application No. PCT/CA2012/001190, dated Mar. 20, 2013, 4 pages.

* cited by examiner

*Primary Examiner* — Ling Choi
*Assistant Examiner* — Chun-Cheng Wang

(57) ABSTRACT

The present invention relates to curing of polymers, particularly to self curing of polymers. The present invention provides a process for curing of copolymers of isoolefins and olefinic monomers. The process includes the step of reacting the copolymer with an azidation reagent to form an azidated copolymer and then heating the azidated copolymer at a suitable temperature to cure the polymer.

25 Claims, 2 Drawing Sheets

PROCESS FOR PREPARING CURED POLYMERS

FIELD OF THE INVENTION

The present invention relates to curing of polymers, particularly to curing of polymers in the absence of substantial amount of curatives.

BACKGROUND

Butyl rubber and related polymers are generally derived from at least one isoolefin monomer and at least one copolymerizable monomer. Commercial butyl rubbers comprise a major portion of isoolefin and a minor amount of a conjugated multiolefin. One example of butyl rubber is poly(isobutylene-co-isoprene), or IIR, which has been prepared since the 1940's through random cationic copolymerization of isobutylene with small amounts of isoprene. The backbone structure of IIR, which is mostly comprised of polyisobutylene segments, imparts superior air impermeability, oxidative stability and excellent fatigue resistance to this material (see, for example, Chu, C. Y. and Vukov, R., *Macromolecules*, 18, 1423-1430, 1985).

In the production of articles made of rubber, curatives are used to toughen or harden the rubber. To achieve an appropriate mechanical property, curatives, often in the form of small molecules, metal oxides, or metal ions, are added to uncured rubbers (this process is also known as compounding) followed by compression molding at an elevated temperature. During the compression molding process, the curatives react to form crosslinks between the polymer chains of the rubber leading to a cured rubber article with meaningful mechanical properties. Such properties include good tensile strength combined with a high elongation and an appropriate compression set.

Conventional cure systems include a sulfur cure, a zinc oxide cure and a peroxide cure. In all three systems the curatives, or byproducts thereof, remain in the cured rubber article. The curatives, or byproducts thereof, could potentially leach out of the article and contaminate the user or the surroundings of the cured rubber article. For example, sulfur-cured rubber articles contain organic or inorganic sulfides and peroxide-cured rubber articles contain alcohols or ketones (and potentially unreacted coagents) that pose the risk of leaching and contaminating the adjacent media. This risk is particularly relevant to the variety of pharmaceutical and consumer goods applications of cured rubber articles (i.e. the sterile solution next to a pharmaceutical stopper or the stopper part of a syringe; the baby food next to the sealing ring of a jar lid).

Accordingly, there remains a need for a "clean" process for curing butyl rubber which reduces or eliminates the use of curatives in curing systems thereby reducing the potential for contaminant leaching.

SUMMARY OF THE INVENTION

It is an object of the present invention is to provide a process for preparing cured polymers. In one embodiment, there is provided a process for preparing a thermally cured rubber, which comprises the steps of reacting a copolymer comprising repeating units derived from at least one isoolefin monomer and repeating units derived from at least one olefinic monomer with an azidation reagent to form an azidated copolymer and then heating the azidated copolymer at a suitable temperature.

In one embodiment, the azidated copolymer has one or more of the repeating units having one or more azide groups attached through a C—N bond.

BRIEF DESCRIPTION OF THE DRAWINGS

Having summarized the invention, embodiments thereof will now be described with reference to the accompanying figures, in which.

DETAILED DESCRIPTION OF THE OF THE INVENTION

Figure 1:
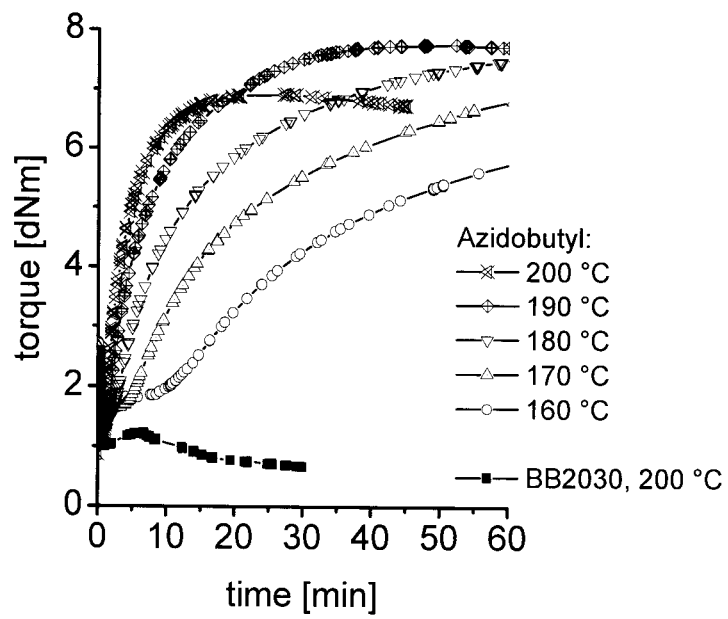
FIG. 1 relates to a Moving Die Rheometer (MDR) diagram of BB2030 (Lanxess Inc.) heated to 200° C. and azidobutyl 9 heated at different temperatures.

The present invention relates to a process for curing butyl rubber type polymers. The process of the present invention starts from reacting a copolymer comprising repeating units derived from at least one isoolefin monomer and repeating units derived from at least one olefinic monomer with an azidation reagent to functionalize the copolymer with at least one azide group. The azidated copolymer is then heated at a suitable temperature to achieve curing of the copolymer.

It has been found unexpectedly that heating azidated copolymer in the absence of any curatives, results in a cure of the copolymer to a commercially useful form. The omission of curatives in the curing process means the cured polymer article is free from the risk of contaminant leaching.

The term "curative" as used herein encompasses any non-polymeric substance or agent that effects cross-linking between polymer chains.

A further advantage of the process of the present invention is that since no curatives are used, curing can be achieved in the absence of additives such as coagents, cure accelerators and cure retarders.

Any heating methods and/or devices that are known by persons skilled in the art to be suitable for heating uncured polymers, rubbers or rubber compounds can be used in the present invention to heat the azidated copolymers. In one embodiment, the azidated copolymer is heated at a temperature of from about 100° C. to about 250° C. In one embodiment, the azidated copolymer is heated at a temperature of from about 130° C. to about 220° C. In one embodiment, the azidated copolymer is heated at a temperature of from about 160° C. to about 200° C.

In one embodiment, the azidated copolymer is heated for a time of at least 5 minutes.

In one embodiment, the process of the present invention further comprises the step of adding one or more auxiliary reagents to the azidated copolymer prior to heating. Suitable auxiliary reagent or component include, but are not limited to, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc. Such auxiliary products for rubbers are known to persons skilled in the art. The auxiliary components are used in conventional amounts, which depend on the intended use. Conventional amounts are, for example, for about 0.1 to about 50 phr.

The azidated copolymers of the present invention comprise repeating units derived from at least one isoolefin monomer and repeating units derived from at least one copolymerizable monomer, wherein one or more of the repeating units derived from the at least one copolymerizable monomer have one or more azide groups attached thereto.

In one embodiment, an azide group is linked to a carbon atom of the repeating units through a C—N bond.

In one embodiment, the one or more repeating units comprising the azide group in the azidated copolymers is not exclusively at the end of the polymer and the average number of azide groups per copolymer chain is equal or greater than 2.

The at least one isoolefin monomer used in preparing the azidated copolymer of the present invention is not limited to a particular isoolefin. In one embodiment, the suitable isoolefins have from 4 to 7 carbon atoms, such as isobutylene, 2-methyl-1-butene, 3-methyl-1-butene, 2-methyl-2-butene, 4-methyl-1-pentene and mixtures thereof are preferred in the present invention. Particularly preferred is isobutylene.

The at least one copolymerizable monomer used in preparing the azidated copolymer of the present invention can be olefinic monomers.

In one embodiment the at least one copolymerizable monomer is a multiolefin monomer, divinyl aromatic monomer, alkyl substituted vinyl aromatic monomer, or mixtures thereof.

The multiolefin monomers used in preparing the azidated copolymers of the present invention are not limited to a particular multiolefin monomer. Suitable multiolefins have from 4 to 14 carbon atoms. Examples of such multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. In one embodiment, the conjugated diene is isoprene.

Alkyl substituted vinyl aromatic monomers and divinyl aromatic monomers useful in the present invention can have an aromatic core such as benzene, naphthalene, anthracene, phenanthrene or biphenyl.

In one embodiment, the divinyl aromatic monomer used in the present invention is vinyl styrene. In one embodiment, the alkyl-substituted vinyl aromatic monomer is a $C_1$-$C_4$ alkyl substituted styrene. In one embodiment, $C_1$-$C_4$ alkyl substituted styrene includes, for example, o-methyl styrene, p-methyl styrene, or m-methyl styrene.

In one embodiment the azidated copolymer of the present invention comprises copolymers of isoolefin and a multiolefin (hereinafter referred to as isoolefin-multiolefin copolymers).

In such an embodiment, one or more of the repeating units derived from the multiolefin monomers comprise an azide moiety. In one embodiment one or more of the repeating units derived from the multiolefin monomers comprise an allylic azide moiety.

In one embodiment the azidated copolymer of the present invention comprises copolymers of isobutylene and isoprene. In one such embodiment the repeating units derived from isoprene comprise allylic azide moiety.

In one embodiment, the monomer mixture used in preparing the isoolefin-multiolefin copolymer comprises from about 80% to about 99.5% by weight of at least one isoolefin monomer and from about 0.5% to about 20% by weight of at least one multiolefin monomer. In one embodiment, the monomer mixture comprises from about 83% to about 98% by weight of at least one isoolefin monomer and from about 2.0% to about 17% by weight of a multiolefin monomer. In one embodiment, the isoolefin-multiolefin copolymer comprises at least 0.5 mol % repeating units derived from the multiolefin monomers. In one embodiment, the repeating units derived from the multiolefin monomers are at least 0.75 mol %. In one embodiment, the repeating units derived from the multiolefin monomers are at least 1.0 mol %. In one embodiment, the repeating units derived from the multiolefin monomers are at least 1.5 mol %. In one embodiment, the repeating units derived from the multiolefin monomers are at least 2.0 mol %. In one embodiment, the repeating units derived from the multiolefin monomers are at least 2.5 mol %.

In one embodiment, the isoolefin-multiolefin copolymer comprises at least 3.0 mol % repeating units derived from the multiolefin monomers. In one embodiment, the repeating units derived from the multiolefin monomers are at least 4.0 mol %. In one embodiment, the repeating units derived from the multiolefin monomers are at least 5.0 mol %. In one embodiment, the repeating units derived from the multiolefin monomers are at least 6.0 mol %. In one embodiment, the repeating units derived from the multiolefin monomers at least 7.0 mol %.

In one embodiment, the repeating units derived from the multiolefin monomers are from about 0.5 mol % to about 20 mol %. In one embodiment, the repeating units derived from the multiolefin monomers are from about 0.5 mol % to about 8 mol %. In one embodiment, the repeating units derived from the multiolefin monomers are from about 0.5 mol % to about 4 mol %. In one embodiment, the repeating units derived from the multiolefin monomers are from about 0.5 mol % to about 2.5 mol %.

The preparation of a isoolefin-multiolefin copolymer having at least about 2.0 mol % repeating units derived from at least one multiolefin monomer is described, for example, in Canadian Patent No. 2,418,884, which is incorporated herein by reference in its entirety.

In one embodiment, the azidated copolymers of the present invention comprise copolymers of at least one isoolefin and one or more alkyl substituted aromatic vinyl monomers. In such an embodiment, one or more of the repeating units derived from the aromatic vinyl monomers comprise the azide moiety.

In one embodiment, the azidated copolymers of the present invention comprise repeating units derived from isobutylene and p-methyl styrene, wherein one or more repeating units derived from the p-methyl styrene have a benzylic azido group.

In one embodiment, the copolymers of isoolefins monomers and alkyl aromatic vinyl monomers comprise repeating units derived from the alkyl aromatic vinyl moieties from about 0.5 weight percent to about 25 weight percent of the copolymer. In one embodiment, the alkyl aromatic repeating units are from about 1 to about 20 weight percent. In one embodiment, the alkyl aromatic repeating units are from about 2 to about 10 weight percent.

In one embodiment, the azidated copolymer of the present invention comprises copolymers of isobutylene and p-methyl styrene, as described in U.S. Pat. No. 5,013,793, which is incorporated herein by reference in its entirety.

In one embodiment, the azidated copolymer of the present invention comprises copolymers of at least one isoolefin, one or more multiolefin monomers, and one or more alkyl substituted aromatic vinyl monomers. In such an embodiment, one or more units derived from the multiolefin monomers comprise an allylic azide moiety and/or one or more units derived from said the substituted aromatic vinyl monomers comprise a azide alkyl moiety.

In one embodiment, the azidated copolymer of the present invention comprises a terpolymer of isobutylene, isoprene and alkyl substituted styrene, wherein one or more repeating units derived from the isoprene have an allylic azido moiety and/or one or more repeating units derived from said p-methyl styrene have a benzylic azido group.

In one embodiment, the azidated copolymer comprises terpolymers of isobutylene, isoprene, and p-methyl styrene as described in U.S. Pat. No. 6,960,632, which is incorporated herein by reference in its entirety.

In one embodiment, the monomer mixture used in preparing the copolymer of iosoolefin, the multiolefin and the alkyl substituted aromatic vinyl monomers comprise from about 80% to about 99% by weight of isoolefin monomers, from about 0.5% to about 5% by weight the multiolefin monomers, and from about 0.5% to about 15% by weight of the alkyl substituted aromatic vinyl monomers. In one embodiment, the monomer mixture comprises from about 85% to about 99% by weight of isoolefin monomer, from about 0.5% to about 5% by weight the multiolefin monomer and from about 0.5% to about 10% by weight alkyl substituted aromatic vinyl monomer.

In one embodiment, the azidated copolymer of the present invention comprises terpolymers of isobutylene, isoprene, and divinyl styrene, as described in U.S. Pat. No. 4,916,180, which is incorporated herein by reference in its entirety.

The mixture used to produce multiolefin butyl rubber polymer may further comprise a multiolefin cross-linking agent. The term cross-linking agent is a term known to persons skilled in the art and is understood to denote a compound that causes chemical cross-linking between the polymer chains as opposed to a monomer that will add to the chain. Examples of suitable cross-linking agents include norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin cross-linking agent is divinyl-benzene, diiso-propenylbenzene, divinyltoluene, divinyl-xylene and $C_1$ to $C_{20}$ alkyl-substituted derivatives thereof, and/or mixtures of the compounds given. Most preferably, the multiolefin cross-linking agent comprises divinyl-benzene and diiso-propenylbenzene.

In one aspect of the present invention, the azidated copolymer of the present invention is a star branched copolymer linked to a branching moiety In one embodiment, the branching moiety is a polymeric branching moiety.

The polymeric branching moiety useful in the formation of the star branched polymer of the present invention includes polymers and copolymers comprising functional groups capable of copolymerizing or forming a covalent bond with the active chain end of a growing polymeric chain of the copolymer used in the formation of the halogenated polymer. The functional group comprises cationically active unsaturation. Non-limiting examples of such polymeric moieties include polydienes, partially hydrogenated polydienes, such as polybutadiene, polyisoprene, polypiperylene, natural rubber, styrene-butadiene rubber, ethylene-propylene diene monomer rubber, styrene-butadiene-styrene and styrene-isoprene-styrene block copolymers. Star branched polymers of the present invention can be prepared by first linking the polymeric chains with the branching moiety followed by halogenations of the polymeric chains. Preparation of starch branch polymers is described in U.S. Pat. No. 5,182,333 and European Publication No., 0 320 263, which are incorporated herein by reference in their entirety.

Preparation of Azidated Copolymers

The azidated copolymers of the present invention can be prepared by reacting the copolymer of at least one isoolefin and at least one copolymerizable monomer with an azidation reagent. This reaction is referred to as azidation reaction.

The azidation reagent can be an azide salt, a covalent azide compound, or mixtures thereof.

Examples of suitable covalent azide compounds include, but are not limited to, halogen azide, trimethylsilyl azide ($Me_3SiN_3$ or $TMSN_3$), p-toluene sulfonyl azide or tosyl azide ($TsN_3$), trifluoromethanesulfonyl azide and hydrogen azide ($HN_3$).

Suitable azide salts for use in the azidation reaction include both organic and inorganic azide salts, would be known and understood by persons skilled in the art. Examples of suitable azide salts include, but are not limited to, sodium azide ($NaN_3$), potassium azide ($KN_3$), ammonium azide ($NH_4N_3$), and tetraalkylammonium azide, such as, tetrabutylammonium azide ($TBAN_3$).

In one embodiment, the azidation reaction is carried out by reacting the azidation reagent with a copolymer of isoolefin and at least one copolymerizable monomer, wherein one or more of the repeating units derived from the copolymerizable monomer are functionalized with one or more oxygen containing functional groups.

In one embodiment the oxygen containing functional group is an epoxide group.

In one embodiment the copolymer comprising the epoxide group is a copolymer of at least one isoolefin monomer and one or more multiolefin monomers, or divinyl aromatic monomer, or both. Non limiting examples of these monomers are as discussed above.

In one embodiment, the azidation reaction is carried out by reacting the azidation reagent with a copolymer of isoolefin and at least one copolymerizable monomer, wherein the copolymer is functionalized with one or more leaving groups. In one embodiment, one or more of the repeating units derived from the at least one copolymerizable monomer are functionalized with the leaving group.

The leaving group can be halogen, amine, $PR_3$, ether, diazonium, oxonium, nonaflate, triflate, fluorosulfonate, tosylate, mesylate, conjugate acid of an alcohol, conjugate acid of an ether, nitrate, phosphate, $SR'_2$, ester, acid anhydride, phenoxide, alcohol, carboxylic acid, or mixtures thereof. Preferably, the leaving group is halogen, amine, $PR_3$, or mixtures thereof.

In one embodiment, substantially all of the repeating units derived from the at least one copolymerizable monomer are covalently bound to leaving groups.

In one embodiment, only some of the repeating units derived from the at least one copolymerizable monomer are covalently bound to leaving groups.

In one embodiment the copolymer comprising the leaving group is a copolymer of at least one isoolefin monomer and a multiolefin monomer, a divinyl aromatic monomer, an alkyl substituted vinyl aromatic monomer, or mixtures thereof. Non limiting examples of these monomers are as discussed above.

In one embodiment the leaving group is halogen.

In one embodiment, the halogenated copolymer used in the formation of the azide functionalized copolymer of the present invention comprises at least one allylic halogen moiety, at least one halo alkyl moiety, or both.

In one embodiment, the halogenated copolymer comprises repeating units derived from at least one isoolefin monomer and repeating units derived from one or more multiolefin monomers. In such an embodiment, one or more of the repeating units derived from the multiolefin monomers comprise an allylic halogen moiety. In one embodiment, the halogenated copolymer is halogenated butyl rubber polymer or halobutyl polymer.

In one embodiment, the halogenated polymer is obtained by first preparing a copolymer from a monomer mixture comprising one or more isoolefins and one or more multiolefins (also referred to as multiolefin butyl rubber polymer), followed by subjecting the resulting copolymer to a halogenation process to form the halogenated polymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein.

During halogenation, some or all of the multiolefin content of the copolymer is converted to units comprising allylic halides. The total allylic halide content of the halogenated polymer cannot exceed the starting multiolefin content of the parent copolymer.

When the multiolefin butyl rubber polymer is halogenated, there may then be both allylic halides, which are derived from the original multiolefin content, and non-halogenated multiolefins present within the same polymer, especially when high multiolefin butyl rubber polymers are used as the starting material for the halobutyl polymer.

In one embodiment, the halogenated isoolefin-multiolefin copolymer may comprise at least about 0.1 mol % allylic halides and/or repeating units derived from allylic halides. In one embodiment, the halogenated isoolefin-multiolefin copolymer may comprise at least about 0.2 mol %, allylic halides and/or repeating units derived from allylic halides. In one embodiment, the halogenated isoolefin-multiolefin copolymer may comprise at least about 0.5 mol % allylic halides and/or repeating units derived from allylic halides. In one embodiment, the halogenated isoolefin-multiolefin copolymer may comprise at least about 0.8 mol % allylic halides and/or repeating units derived from allylic halides. In one embodiment, the halogenated isoolefin-multiolefin copolymer may comprise at least about 1.0 mol % allylic halides and/or repeating units derived from allylic halides.

In one embodiment, the halogenated copolymer of the present invention comprises copolymers of at least one isoolefin and one or more alkyl substituted aromatic vinyl monomers. In such an embodiment, one or more of the repeating units derived from the aromatic vinyl monomers comprise a halo alkyl moiety.

In one embodiment, these type of halogenated polymers are obtained by first preparing a copolymer from a monomer mixture comprising one or more isoolefins and one or more alkyl substituted aromatic vinyl monomers, followed by subjecting the resulting copolymer to a halogenation process to form the halogenated polymer. During halogenation, some or all of the alkyl groups of the repeating units derived from the aromatic vinyl monomers are halogenated.

In one embodiment, the halogenated polymers of the present invention comprise co-polymers of isoolefin and methyl styrene, wherein after halogenations, methyl group of some or all of the repeating units derived from the methyl styrene are converted to benzylic halides. The total benzylic halide content of the halobutyl polymer cannot exceed the starting styrenic content of the parent butyl compound.

In one embodiment, the copolymers of isoolefins monomers and alkyl aromatic vinyl monomers comprise repeating units derived from the alkyl aromatic vinyl moieties from about 0.5 weight percent to about 25 weight percent of the copolymer. In one embodiment, the alkyl aromatic repeating units are from about 1 to about 20 weight percent. In one embodiment, the alkyl aromatic repeating units are from about 2 to about 10 weight percent.

In one embodiment, the halogenated polymer of the present invention comprises copolymers of isobutylene and p-methyl styrene, as described in U.S. Pat. No. 5,013,793, which is incorporated herein by reference in its entirety. In one embodiment, the halogenated polymer of the present invention comprises copolymers of isobutylene and p-methyl styrene having styrene content from about 5% to 7% and halogen content from about 0.5 to 1.5%.

In one embodiment, the halogenated polymer of the present invention comprises copolymers of at least one isoolefin, one or more multiolefin monomers, and one or more alkyl substituted aromatic vinyl monomers. In such an embodiment, one or more units derived from the multiolefin monomers comprise an allylic halogen moiety and/or one or more units derived from the the substituted aromatic vinyl monomers comprise a halo alkyl moiety.

These type of halogenated polymers can be formed by first preparing a copolymer from a monomer mixture comprising the isoolefin, the multiolefin and the alkyl substituted aromatic vinyl monomers, followed by subjecting the resulting copolymer to halogenation process to halogenate the repeating units derived from the multiolefin monomers and/or the alkyl group of the repeating units derived from aromatic vinyl monomers.

In one embodiment, the monomer mixture used in preparing the copolymer of iosoolefin, the multiolefin and the alkyl substituted aromatic vinyl monomers comprise from about 80% to about 99% by weight of isoolefin monomers, from about 0.5% to about 5% by weight the multiolefin monomers, and from about 0.5% to about 15% by weight of the alkyl substituted aromatic vinyl monomers. In one embodiment, the monomer mixture comprises from about 85% to about 99% by weight of isoolefin monomer, from about 0.5% to about 5% by weight the multiolefin monomer and from about 0.5% to about 10% by weight alkyl substituted aromatic vinyl monomer.

In one embodiment, the halogenated polymer comprises terpolymers of isobutylene, isoprene, and p-methyl styrene as described in U.S. Pat. No. 6,960,632, which is incorporated herein by reference in its entirety.

In one embodiment, the amount of azidation reagent reacted with the copolymer functionalized with the leaving group or the oxygen containing functional groups to produce azidated copolymer can range from about 50 to about 0.05 molar equivalents, preferably about 15 to about 0.05 molar equivalents, more preferably about 7 to about 0.05 molar equivalents and even more preferably about 1.5 to about 0.1 molar equivalents, based on the total molar amount of functional groups in the copolymer.

The azidation reaction to synthesize azidated copolymer can be carried out in solution or in bulk (i.e. in the absence of a solvent).

When the reaction is carried out in solution, the process comprises the step of adding the starting copolymer and the azidation reagent to a solvent to form a reaction mixture.

Suitable solvents include, but are not limited to, tetrahydrofuran (THF), dichloromethane, chlorobenzene, dichlorobenzenes, toluene and chloroform. The addition of a second solvent to the reaction mixture, such as N,N-dimethylformamide (DMF), can be used to facilitate the solubilization of the azidation reagent and it is particularly helpful to add DMF when using $NaN_3$. Persons skilled in the art would know how to control the ratio between the first solvent and the additional second solvent to avoid unwanted polymer precipitation.

In one embodiment, the reaction between the starting copolymer and the azidation reagent is carried out in bulk using conventional mixers. Examples of suitable mixers include, but are not limited to, a Banbury mixer, a miniature internal mixer (such as a Haake or Brabender mixer), a two roll mill mixer, and extruders (such as single screw and twin screw extruders).

In one embodiment, when the azidation reaction is carried out in solution, the starting copolymer can be present in an amount of at least about 0.5%, preferably at least about 2%, more preferably at least about 4%, and even more preferably at least about 10% by weight of the reaction mixture.

In one embodiment the azidation reaction is carried out at room temperature and in solution.

Without limitation to a particular hypothesis, it is considered that the synthesis of azidated copolymer, when a halogenated copolymer is reacted with an azidation reagent (such as azide salt), proceeds by nucleophilic displacement of a halogen atom by the azido group derived from the azidation reagent. Without limitation to a particular hypothesis, it is considered that when the halogenated copolymer polymer is a terpolymer of which the units derived from two different monomers are halogenated, the nucleophilic displacement may occur only to the halogens of the halogenated units derived from one monomer.

In one embodiment, azidated and non-azidated units may both be present in the same azidobutyl polymer.

The invention will now be described with reference to specific examples. It will be understood that the following examples are intended to describe embodiments of the invention and are not intended to limit the invention in any way.

EXAMPLES

The Examples use common equipment and materials as following unless otherwise specified.

$^1$H NMR spectra were recorded with a Bruker 300 MHz or 500 MHZ spectrometer in $CDCl_3$ unless otherwise mentioned. Chemical shifts were referenced to tetramethylsilane.

FT-IR spectra were acquired on a Bruker Vector 22 FT-IR spectrophotometer. Spectra were acquired from 700 to 4000 $cm^{-1}$ with a resolution of 1 $cm^{-1}$ and a total of 16 scans per spectrum.

Thin films were deposited on a NaCl plate from a 2% sample solution and the analysis was performed after complete evaporation of the solvent.

Cyclohexane (Caledon, reagent grade) was purified by refluxing with oligostyryllithium under nitrogen ($N_2$) atmosphere.

Other chemicals were used as received from the suppliers: deuterated chloroform ($CDCl_3$), 99.8%, Cambridge Isotope Laboratories; allyl bromide, 99%, Aldrich; zinc chloride, 98%, BDH Chemicals; N-bromosuccinimide, >95%, Fluka; benzoyl peroxide, 99%.

The experimental butyl rubbers, used as supplied by LANXESS Inc., were resulted from different levels of bromination of a copolymer of isobutylene and isoprene with 5.3 mol % isoprene units, such that active bromine levels of 2.3 mol %, 3.3 mol % and 4.3 mol % were obtained respectively. Terpolymer TERP-10% BR was used as supplied by LANXESS Inc. and is a copolymer of isobutene, isoprene and p-methylstyrene containing 1.2 mol % brominated isoprene units and 10 mol % methylstyrene. The commercial butyl rubbers used were LANXESS Bromobutyl 2030, with an active bromine level of 0.85 mol %. Sodium azide ($NaN_3$), tetrabutylammonium azide ($TBAN_3$), tetrahydrofuran (THF) and N,N-dimethylformamide (DMF) were ordered from Aldrich and used as received.

BIMS1 and BIMS2 are brominated copoylmers of isobutylene and methyl styrene. BIMS1 has styrene content of 5%, a bromide content of 0.5%, and a Mooney viscosity of 45. BIMS2 has styrene content of about 7%, a bromide content of about 1.2%, and a Mooney viscosity of 45.

Examples 1 to 19

Azidation Reactions of Brominated Butyl Rubber Polymers with Azidation Reagents

The experimental details for Examples 1 to 19 are summarized in Table 1 below. The respective butyl rubber polymer was dissolved in THF or $CDCl_3$. The second solvent, DMF, was added to specific Examples as indicated. Then, the azide salt ($NaN_3$ or $TBAN_3$) was added and the mixture was stirred or shaken for the indicated time at room temperature. Then, the resulting azidobutyl in the mixture was precipitated via the addition of ethanol and was purified by 2 more dissolution/precipitation steps and further dried under vacuum. When more than 15 g of azidobutyl was obtained, the azidobutyl was dried at 80° C.-100° C. by calendaring on a 2-roll mill. The conversion percentages were calculated from $^1$H NMR data as the ratio between the mol % of the allylic azide groups of the resulting azidobutyl and the mol % of the allylic bromides in the starting butyl rubber polymer.

Example 20

Figure 3:
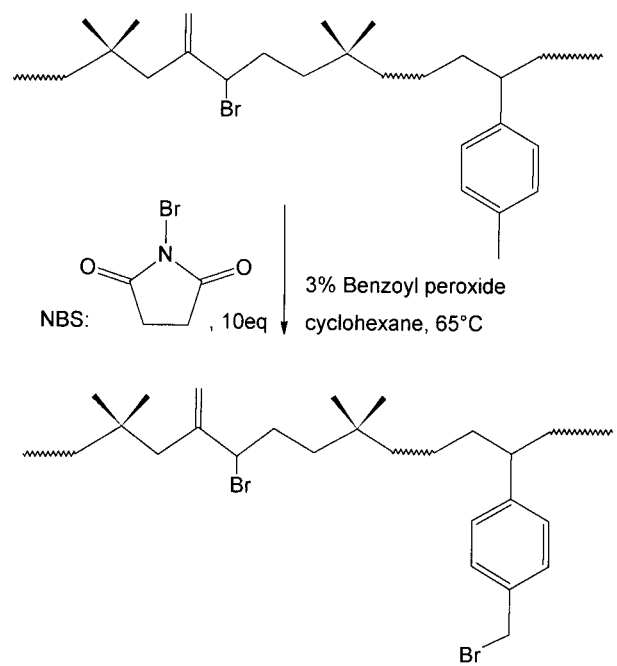
FIG. 3 shows the reaction scheme for Example 20.

Halogenation of Butyl Rubber Terpolymer 1 g TERP-10% BR (10% p-methyl styrene and 1.2 mol % brominated isoprene units=$1.58 \times 10^{-3}$ mol p-methyl styrene units) was dried overnight under vacuum before it was dissolved in 100 mL of dry, freshly distilled cyclohexane. The solution was heated to 65° C., and 3% benzoyl peroxide (12 mg) and 10 equiv N-bromosuccinimide (2.81 g) were added. After 6 h, the polymer solution was concentrated to 50 mL and precipitated in 300 mL of cold methanol (0° C.). The polymer was further purified with two additional cycles of dissolution in 50 mL of THF and precipitation in 300 mL of methanol. The polymer obtained was finally dissolved in chloroform and dried before NMR analysis. The NMR analysis indicated quantitative bromination of the methyl groups of the p-methyl styrene units. The reaction scheme is depicted in FIG. 3.

Example 21

Azidation of Halogenated Butyl Rubber Terpolymer 20

Figure 4:
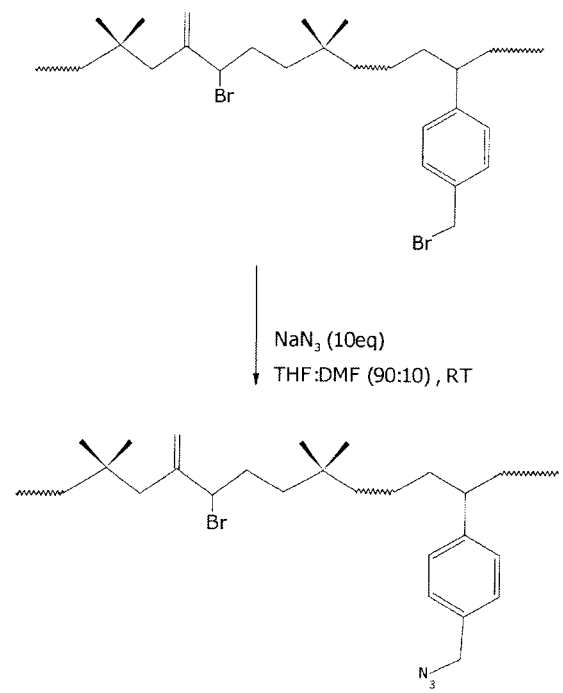
FIG. 4 shows the reaction scheme for Example 21.

1 g fully brominated terpolymer of Example 9 was dissolved in 90 mL of dry, freshly distilled THF. Once the polymer was dissolved, 10 mL of DMF and 10 equiv sodium azide (1.03 g) were added to the mixture. The reaction was stirred at room temperature until the reaction was complete as monitored by $^1$H NMR spectroscopy. The polymer solution was worked up as outlined in Example 1. A conversion of 75% of the original bromide to azide group was achieved as determined by NMR analysis. The reaction scheme is depicted in FIG. 4.

Characterization

The resulting products were characterized by $^1$H NMR and IR spectroscopy. For example, the exo-allylic bromide unit in BB2030 generates peaks at 5.40, 5.03 and 4.35 ppm. As these units react with the azide anion, these peaks decrease in intensity. In case of BB2030, the peaks at 5.18 (s), 5.04 (s) and 3.65 (two overlapping t, appearing as dt) ppm indicated the formation of an exo-allylic $N_3$ unit. There is further $^1$H NMR evidence for the formation of endo-allylic $N_3$ units in an E and Z configuration. These units generate signals at 5.54 (t), 5.47 (t), 3.81 (s) and 3.71 (s) ppm. Signals that are assigned to non-halogenated olefinic units are unaffected by the azide substitution reaction (i.e. t at 5.07 ppm for 1,4-isoprenyl unit and d for the branched unit at 4.93 ppm).

Conversion of benzylic bromide units to benzylic azide units is reflected in $^1$H NMR spectra by a decrease in signal intensity for Ar—CH$_2$Br at 4.5. ppm and the occurrence of a novel signal at 4.3 ppm, which is in consistence with the formation of Ar—CH$_2$—N$_3$.

The azide substitution levels of the azidated copolymers comprising allylic azide group were calculated according to the sum of the NMR peaks at 3.68 and 3.8 ppm (proton in the position alpha to the azide group).

The azide substitution levels of the azidated copolymers comprising benzylic azide group were calculated from the sum of the NMR peaks at 3.85 and 3.9 ppm (benzylic CH$_2$ connected to the azide group).

The presence of azide group on the polymers was also confirmed by FTIR analysis through a peak at 2097 cm$^{-1}$ characteristic for azide N=N bond.

Example 22

Curing of Azidated Copolymers

Figure 2:
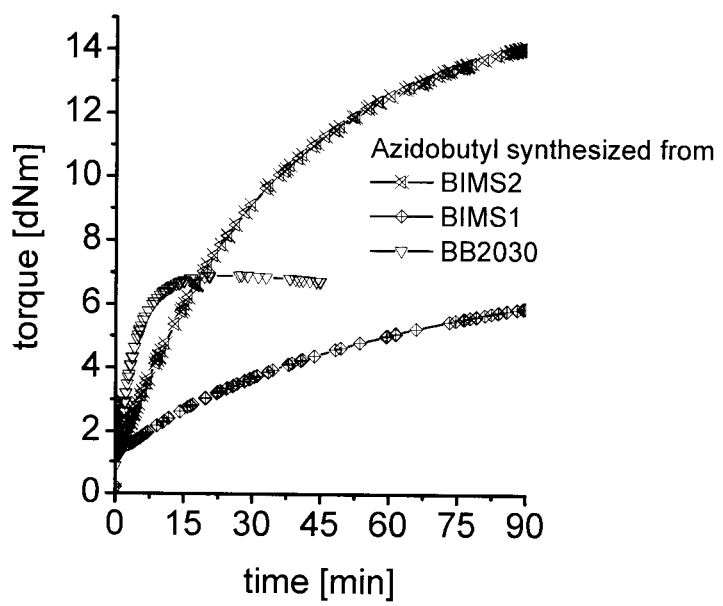
FIG. 2 relates to a Moving Die Rheometer (MDR) diagram of Examples 9, 12, 14 and 15 at 200° C.

Certain of the azidobutyls synthesized above were subjected to Moving Die Rheometer (MDR) measurements at a variety of temperatures, and BB2030 was used as a control. The results from these experiments are summarized in Table 2 and FIGS. 1 and 2. FIG. 1 depicts MDR run for azidated copolymer of Example 9 at different temperatures, and MDR run for BB2030 (i.e. bromobutyl without azide groups) at 200° C. FIG. 2 depicts the MDR run at 200° C. for azidated copolymers of Examples 9, 14 and 15.

FIGS. 1 and 2 clearly shows that BB2030 did not undergo cross-linking between bromobutyl rubber polymers, as the torque decreased with time when heated at 200° C. The rubber turned dark brown during the temperature treatment. The torque curves recorded with azidobutyls 9, 12, 14 and 15, however, clearly show an increase in torque upon heating, which is consistent with cross-linking between azidobutyl polymers.

TABLE 1

| Example # | Butyl-grade type | mol % Br | mol % IP | mol % MS | Azide | Solv. 1 type | m [g] | opt. Solv. 2 type | m [g] | $m_{N3}$ [g] | $m_{BIIR}$ [g] | eq. $N_3$ | t [d] | conversion |
|---|---|---|---|---|---|---|---|---|---|---|---|---|---|---|
| 1 | experimental | 4.0% | 1.2% | | NaN$_3$ | THF | 80.0 | DMF | 9.4 | 0.44 | 1.00 | 10.0 | 4 | 87% |
| 2 | experimental | 3.3% | 1.9% | | NaN$_3$ | THF | 80.0 | DMF | 9.4 | 0.36 | 1.00 | 10.1 | 4 | 84% |
| 3 | experimental | 2.3% | 3.0% | | NaN$_3$ | THF | 80.0 | DMF | 9.4 | 0.25 | 1.00 | 9.9 | 4 | 100% |
| 4 | BB2030 | 0.85% | 0.60% | | TBAN$_3$ | THF | 16.45 | | | 0.143 | 0.493 | 6.85 | 4 | 95% |
| 5 | BB2030 | 0.85% | 0.60% | | NaN$_3$ | THF | 46.30 | DMF | 6.6 | 0.13 | 2.10 | 6.39 | 4 | 76% |
| 6 | BB2030 | 0.85% | 0.60% | | NaN$_3$ | THF | 31.15 | DMF | 4.7 | 0.10 | 1.01 | 10.24 | 4 | 76% |
| 7 | BB2030 | 0.85% | 0.60% | | TBAN$_3$ | THF | 680 | | | 2.50 | 40.6 | 1.45 | 2 | 99% |
| 8 | BB2030 | 0.85% | 0.60% | | TBAN$_3$ | CDCl$_3$ | 2.25 | | | 0.006 | 0.04 | 3.68 | 1.5 | 95% |
| 9 | BB2030 | 0.85% | 0.60% | | TBAN$_3$ | THF | 1913.9 | | | 11.2 | 241 | 1.10 | 1 | 100% |
| 10 | BB2030 | 0.85% | 0.60% | | TBAN$_3$ | THF | 235 | | | 0.653 | 21.8 | 0.71 | 1 | 67% |
| 11 | BB2030 | 0.85% | 0.60% | | TBAN$_3$ | THF | 175 | | | 0.645 | 17.9 | 0.85 | 1 | 80% |
| 12 | BB2030 | 0.85% | 0.60% | | TBAN$_3$ | THF | 956 | | | 6.38 | 111 | 1.36 | 1 | 100% |
| 13 | BB2030 | 0.85% | 0.60% | | TBAN$_3$ | THF | 1335 | | | 13 | 250 | 1.23 | 0.8 | 94% |
| 14 | BIMS1 | 0.51% | | 2.34% | TBAN$_3$ | THF | 133.38 | | | 0.74 | 25 | 1.20 | 0.8 | 81% |
| 15 | BIMS2 | 1.17% | | 3.06% | TBAN$_3$ | THF | 133.38 | | | 1.72 | 25.16 | 1.25 | 0.8 | 92% |
| 16 | BB2030 | 0.86% | 0.72% | | TBAN$_3$ | THF | 1333.8 | | | 12.9 | 250 | 1.20 | 0.8 | 105% |
| 17 | BB2030 | 0.84% | 0.72% | | TBAN$_3$ | THF | 1333.8 | | | 3.233 | 250 | 0.31 | 0.8 | 37% |
| 18 | BBX2 | 0.85% | 0.62% | | TBAN$_3$ | THF | 1333.8 | | | 10.9 | 250 | 1.03 | 0.2 | 85% |
| 19 | BB2030 | 0.84% | 0.72% | | TBAN$_3$ | THF | 1333.8 | | | 12.9 | 250 | 1.23 | 0.2 | 106% |
| 21 | Terpolymer | | | | NaN$_3$ | THF | 80.0 | DMF | 9.4 | 1.03 | 1.00 | 10.0 | 3 | 75% |

TABLE 2

MDR cure characteristics of Examples 9, 12, 14 and 15

| AzidoButyl | 9 | 9 | 9 | 9 | 9 | 12 | 14 | 14 | 15 | 15 |
|---|---|---|---|---|---|---|---|---|---|---|
| Temperature ° C. | 160 | 170 | 180 | 190 | 200 | 190 | 200 | 210 | 200 | 210 |
| Run time [min] | 90 | 90 | 90 | 60 | 45 | 60 | 90 | 120 | 90 | 120 |
| Δm [dNm] | 4.7 | 5.9 | 6.3 | 6.5 | 5.7 | 6.9 | 4.4 | 5.1 | 12.5 | 12.1 |
| $m_I$ [dNm] | 1.8 | 1.6 | 1.5 | 1.3 | 1.2 | 1.2 | 1.5 | 1.3 | 1.6 | 1.5 |

TABLE 2-continued

MDR cure characteristics of Examples 9, 12, 14 and 15

| AzidoButyl | 9 | 9 | 9 | 9 | 9 | 12 | 14 | 14 | 15 | 15 |
|---|---|---|---|---|---|---|---|---|---|---|
| $m_h$ [dNm] | 6.5 | 7.5 | 7.7 | 7.8 | 6.9 | 8.1 | 5.9 | 6.4 | 14.1 | 13.7 |
| $t_{90}$ [min] | 70.5 | 63.3 | 42.2 | 22.6 | 10.3 | 31.2 | 73.3 |  | 64.4 | . |

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be appreciated by those skilled in the art that various other changes and modifications can be made without departing from the scope of the invention. It is therefore intended to cover in the appended claims all such changes and modifications that are within the scope of this invention.

We claim:

1. A process for preparing a cured elastomer, the process comprising the steps of:
   reacting a copolymer comprising repeating units derived from at least one isoolefin monomer and repeating units derived from at least one olefinic monomer with an azidation reagent to form an azidated copolymer comprising azide groups; and
   heating the azidated copolymer at a suitable temperature to form cured elastomer;
   wherein one or more of the repeating units have one or more azide groups attached through a C—N bond.

2. The process according to claim 1, wherein the azidated copolymer is heated at a temperature of from about 100° C. to about 250° C.

3. The process according to claim 1, wherein the azidated copolymer is heated at a temperature of from about 130° C. to about 220° C.

4. The process according to claim 1, wherein the azidated copolymer is heated at a temperature of from about 160° C. to about 200° C.

5. The process according to claim 1 or 2, wherein the process is carried out in the absence of curatives.

6. The process according to claim 1, wherein the azidation reagent is an azide salt, a covalent azide compound, or mixtures thereof.

7. The process according to claim 6, wherein the azide salt is $NaN_3$, $KN_3$, $NH_4N_3$ or $TBAN_3$.

8. The process according to claim 6, wherein the covalent azide compound is halogen azide, $Me_3SiN_3$ or $HN_3$.

9. The process of claim 1, wherein said process comprises the step of functionalizing said copolymer with a leaving group or an oxygen containing functional group prior to reacting with said azidation reagent.

10. The process according to claim 9, wherein said copolymer is functionalized with said leaving group.

11. The process according to claim 10, wherein said leaving group is halogen, ether, diazonium, oxonium, nonaflate, triflate, fluorosulfonate, tosylate, mesylate, conjugate acid of an alcohol, conjugate acid of an ether, nitrate, phosphate, $SR'_2$, ester, acid anhydride, amine, $PR_3$, phenoxide, alcohol, carboxylic acid, or mixtures thereof.

12. The process according to claim 10, wherein said leaving group is halogen.

13. The process according to claim 9, wherein said copolymer is functionalized with the oxygen containing group.

14. The process according to claim 13, wherein said oxygen containing group is an epoxide.

15. The process according to claim 1, wherein the at least one olefinic monomer is at least one multiolefin monomer, at least one alkyl substituted vinyl aromatic monomer, or both.

16. The process according to claim 15, wherein said copolymer comprises repeating units derived from said at least one isoolefin monomer and repeating units derived from said at least one multiolefin monomer.

17. The process according to claim 16, wherein said copolymer further comprises repeating units derived from at least one divinyl aromatic monomer.

18. The process according to claim 15, wherein said copolymer comprises repeating units derived from said at least one isoolefin, repeating units derived from said at least one muitiolefin monomer, and repeating units derived from said at least one alkyl substituted aromatic vinyl monomer.

19. The process according to claim 1, wherein the reaction between said azidation reagent and the copolymer is carded out in bulk or in the presence of a solvent.

20. The process according to claim 19, wherein said reaction between said azidation reagent and the copolymer is carried out in an azidation reagent solubilizing solvent.

21. The process according to claim 19, comprising the step of adding the copolymer and the azidation reagent to the solvent to form a reaction mixture.

22. The process according to claim 21, further comprising the step of adding an additional solvent to the reaction mixture.

23. The process according to claim 22, wherein the molar ratio of the azidation reagent to the copolymer in the reaction mixture is from about 50 to about 0.05.

24. The process according to claim 22, wherein copolymer is of at least about 0.5%, by weight of the reaction mixture.

25. The process according to claim 22, wherein:
   the molar ratio of the azidation reagent to the copolymer in the reaction mixture is from about 1.5 to about 0,1; and
   the copolymer is of at least about 10% by weight of the reaction mixture.

* * * * *